(12) United States Patent
Brazier et al.

(10) Patent No.: US 6,484,742 B1
(45) Date of Patent: Nov. 26, 2002

(54) CARTRIDGE ASSEMBLY FOR VALVE

(75) Inventors: Geof Brazier, Tulsa, OK (US); Arthur Dubbeldam, Ardrossan (CA); Peter Dubbeldam, Ardrossan (CA)

(73) Assignee: BS & B Safety Systems, Inc., Tulsa, OK (US)

( * ) Notice: Subject to any disclaimer, the term of this patent is extended or adjusted under 35 U.S.C. 154(b) by 0 days.

(21) Appl. No.: 09/538,979

(22) Filed: Mar. 30, 2000

(51) Int. Cl.⁷ .............................. F16K 17/40; F16K 1/22
(52) U.S. Cl. .................. 137/68.11; 137/67; 137/70; 137/75; 137/80; 137/269; 137/461
(58) Field of Search ................... 137/67, 68.11, 137/70, 269, 72, 75, 76, 79, 80, 68.16, 68.17, 461, 551, 559; 251/304, 309, 173

(56) References Cited

U.S. PATENT DOCUMENTS

| | | | |
|---|---|---|---|
| 2,912,992 A | * 11/1959 | Gasche et al. | 137/70 |
| 4,317,470 A | 3/1982 | Taylor | |
| 4,437,482 A | * 3/1984 | Harrison | 137/67 |
| 4,724,857 A | 2/1988 | Taylor | |
| 4,787,409 A | 11/1988 | Taylor | |
| 5,012,834 A | 5/1991 | Taylor | |
| 5,067,511 A | 11/1991 | Taylor | |
| 5,144,973 A | * 9/1992 | Green et al. | 137/68.11 |
| 5,273,065 A | 12/1993 | Taylor | |
| 5,348,039 A | 9/1994 | Taylor et al. | |
| 5,577,523 A | * 11/1996 | Taylor | 137/70 |
| 5,577,524 A | 11/1996 | Taylor | |
| 5,623,958 A | * 4/1997 | Bumpers | 137/269 |
| 5,685,329 A | 11/1997 | Taylor | |
| 5,947,445 A | * 9/1999 | Wang et al. | 251/306 |

* cited by examiner

Primary Examiner—John Rivell
Assistant Examiner—Ramesh Krishnamurthy
(74) Attorney, Agent, or Firm—Finnegan, Henderson, Farabow, Garrett & Dunner, L.L.P.

(57) ABSTRACT

A cartridge assembly for a valve is disclosed. The cartridge assembly includes a cartridge containing an activation component. The cartridge and activation component are configured to be replaceable as a unit. The activation component prevents the valve from either opening or closing until either a predetermined pressure is exerted on the valve or a predetermined temperature is experienced by the activation component. The cartridge may include any of a variety of activation component types, such as buckling pins, tensile pins, shear pins, springs, or fusible alloys, either individually or in combination to control the valve opening or closing.

82 Claims, 11 Drawing Sheets

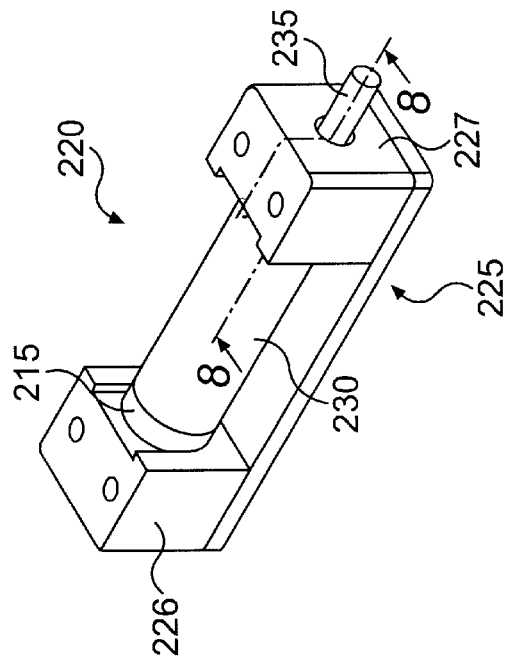
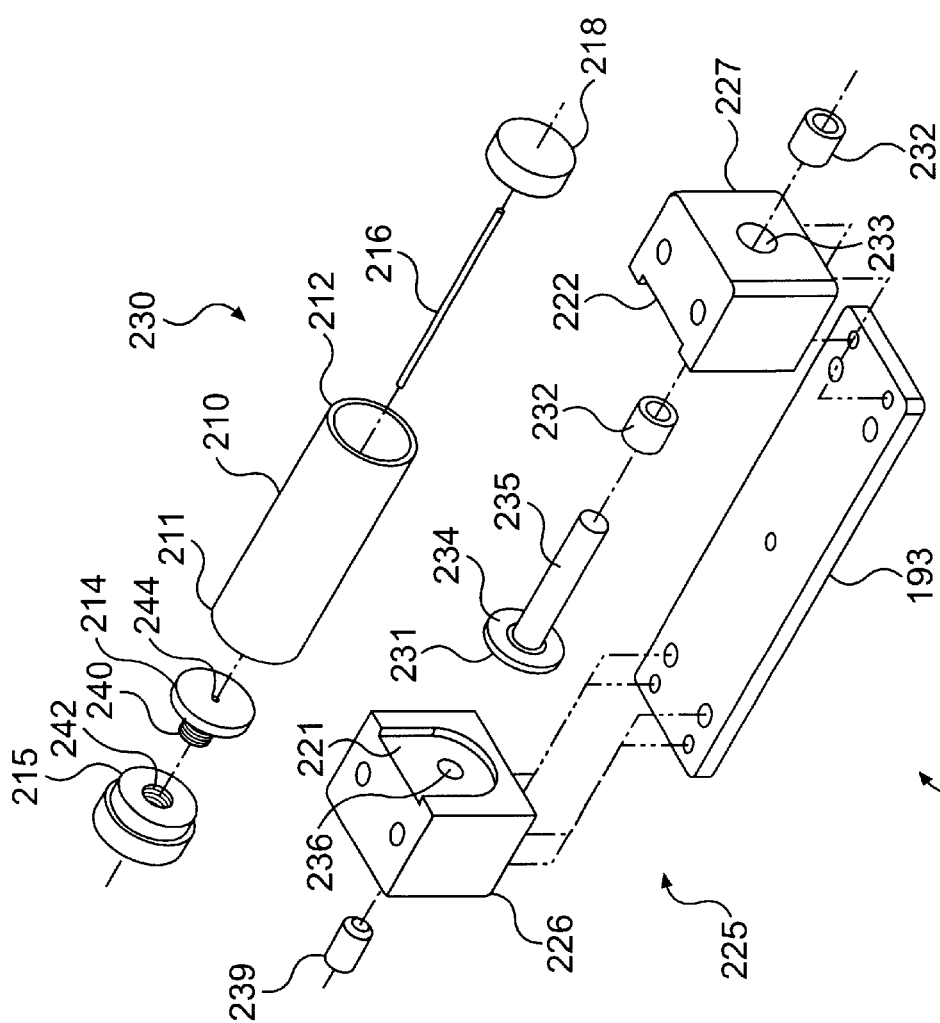

CARTRIDGE ASSEMBLY FOR VALVE

BACKGROUND OF THE INVENTION

This invention generally relates to systems for controlling pressure in a pressurized system. More particularly, the present invention relates to a cartridge assembly for a valve.

There are many types of systems that process, transmit or use a pressurized fluid. To ensure the safety of these types of systems, each such system typically includes a pressure relief valve designed to prevent the over-pressurization of the system. In an emergency situation, where the fluid in the system reaches an unsafe level, the high pressure of the fluid acts on the pressure relief valve to create an opening to release fluid from the system. Venting fluid to the environment or a safety reservoir through the opening reduces the pressure in the system and prevents another portion of the system from failing due to the high pressure of the fluid.

A common type of pressure relief valve is a rotatable valve assembly. A rotatable valve includes a plug that is mounted on a rotatable shaft and may be rotated between a closed position where the plug blocks the flow of fluid and an open position where the plug allows fluid to flow through the valve. The plug may be mounted on the shaft so that the rotational axis of the plug is offset relative to the center of the plug. Consequently, the pressurized fluid exerts a torque on the shaft and urges the plug to rotate.

Commonly, an activation component such as a buckling pin is operatively coupled to the shaft to prevent the shaft from rotating until the torque on the shaft reaches a certain level indicating that the pressure of the fluid has reached an over-pressure situation. When the pressure of the system reaches a predetermined safety level in such systems, the torque exerted on the valve by the pressurized fluid exceeds the resistance of the pin that keeps the valve from opening. When this event occurs, the pin fails and subsequently the valve opens for the fluid to escape to relieve the pressure in the system.

However, a bare pin used for a pressure relief valve requires considerable care and control during installation. Maintenance personnel must ensure that the bare pin is properly secured and tightened to bear the pressure exerted on the pressure relief valve. Failure to do so may result in untimely opening of the valve. A premature opening below the predetermined safety level leads to an unwanted downtime for the system, while a delayed opening above the predetermined safety level jeopardizes the physical integrity of the system.

Another problem with a bare pin is that there is a risk of pin damage stemming from maintenance personnel having to contact the bare pin during installation or maintenance. This risk of pin damage is especially high for a fragile, low pressure bare pin.

Still, another problem with a bare pin is that the bare pins are difficult to mark with serial numbers and/or certification stamps. Often, a serial number is needed for traceability and control purposes, and industry code certification stamps are needed to indicate a compliance with relevant code requirements. Directly stamping the pins with serial numbers and/or certification stamps will damage the pins.

Yet, another problem with existing systems is that it is a skilled and time consuming activity to remove and reinstall the bare pin. Many times, the bare pin needs to be decoupled from the pressure relief valve for the inspection and maintenance of the system including the pressure relief valve. Due to the risk of pin damage and the caution needed to properly secure and tighten the bare pin, a considerable amount of time is spent in removing and reinstalling the bare pin.

A further problem with existing systems is the need to install bare pins such that they are loaded perfectly along their length axis. Improper pin loading results in loss of set pressure accuracy for the pressure relief device and reduced service life.

In light of the foregoing, there is a need for a device for a pressure relief valve that (1) obviates the care and control needed during installation, (2) reduces the possibility of damaging the activation component during pre-installation storage and shipping, installation, use, and maintenance, (3) decreases the time needed to replace the activation component, (4) enables a complete identification and relevant code stamping of the activation component, (5) reduces the precision required in mounting the pin for proper loading, and (6) provides for the convenient removal and reinstallation of the activation component for valve inspection purposes without impairing its performance characteristics.

SUMMARY OF THE INVENTION

Accordingly, the present invention is directed to a device for a pressure relief valve that obviates one or more of the limitations and disadvantages of prior art release devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a pressure relief device containing a pressurized fluid. The pressure relief device includes a rotatable plug engageable with the system to expose the plug to the pressurized fluid. The fluid acts on the plug to rotate the plug from a closed position to an open position. An activation component is operatively connectible to the plug and is configured to prevent the plug from rotating until a predetermined pressure is exerted on the plug. A cartridge having a hollow body with a first and second end is provided. The hollow body substantially encloses the activation component so that the cartridge and the activation component are replaceable as a unit without any contact with the activation component. A support member is configured to receive the cartridge to operatively connect the activation component with the plug.

In another aspect, the invention is directed to a cartridge assembly for a valve containing a member movable between a first position and a second position. The cartridge assembly includes an activation component operatively connectible with the pressure relief valve. The activation component prevents the member from moving from the first position to the second position until a predetermined pressure is exerted on the valve. The cartridge assembly further includes a cartridge having a hollow body with a first and second end. The hollow body substantially encloses the activation component so that the cartridge and the activation component are replaceable without any contact with the activation component. A support structure engageable with the cartridge is provided to operatively connect the activation component with the valve.

In yet another aspect, the invention is directed to a cartridge for a valve operable between a first configuration and a second configuration. The cartridge includes an activation component operatively connectible with the valve. The activation component maintains the valve in the first configuration until a predetermined pressure is exerted on the valve to force the valve toward the second configuration. The cartridge further includes a hollow body having a first and second end. The hollow body substantially encloses the activation component so that the cartridge is replaceable without any contact with the activation component.

In yet another aspect, the invention is directed to a cartridge for a valve containing a member movable between a first position and a second position. The cartridge includes an activation component operatively connectible with the valve. The activation component maintains the member in the first position. The activation component includes a fusible alloy that liquifies, thereby allowing the member to move toward the second position. The cartridge further includes a hollow body having a first and second end. The hollow body holds the activation component so that the hollow body and the activation component are replaceable as a unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

FIG. 6 is an exploded view of a cartridge assembly according to the present invention;

FIG. 7 is a perspective view of a cartridge assembly according to the present invention;

DETAILED DESCRIPTION

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a cartridge assembly of the present invention is shown in FIGS. 6 and 7 designated generally by reference number 220.

For purposes of following description, the term "activation component" refers to any device configured to maintain a valve in a first configuration until a predetermined pressure is exerted on the valve or until a predetermined temperature is experienced whereupon the particular device will allow the valve to move to a second configuration. By way of non-limiting examples, activation components include pressure sensitive elements such as buckling pins, shear pins, tensile pins, springs and other equivalent structures. It is also contemplated that the activation component may include a temperature sensitive element such as fusible alloys and other equivalent structures. It is further contemplated that the activation component may reset automatically to allow the valve to return to the first configuration once the pressure exerted on the valve has been decreased below the predetermined pressure. Such an activation component may include a spring.

In accordance with the present invention, there is provided a pressure relief device for a system containing a pressurized fluid. The pressure relief device includes a pressure relief valve. Preferably, the pressure relief valve is a rotatable plug type. Exemplary embodiments of such pressure relief valves are disclosed in U.S. Pat. No. 5,607,140 (Short, III et al.), U.S. Pat. No. 5,984,269 (Short, III et al.) and U.S. Pat. No. 5,947,445 (Wang et al.) and in co-pending U.S. patent application Ser. No. 09/478,494, the disclosures of which are herein incorporated by reference in their entirety. It is contemplated that the cartridge assembly of the present invention may be used in a wide variety of valves and is by no means limited to a specific type of pressure relief valve.

In rotatable plug pressure relief valves, the relief valves are engageable with a pressurized system to expose the rotatable plug to the fluid within the system. Preferably, as explained in greater detail below, the plug is mounted in an offset fashion such that the fluid acts on the plug to rotate the plug from a closed position to an open position. This rotation of the plug creates a vent path though which fluid may escape the system.

Figure 1:
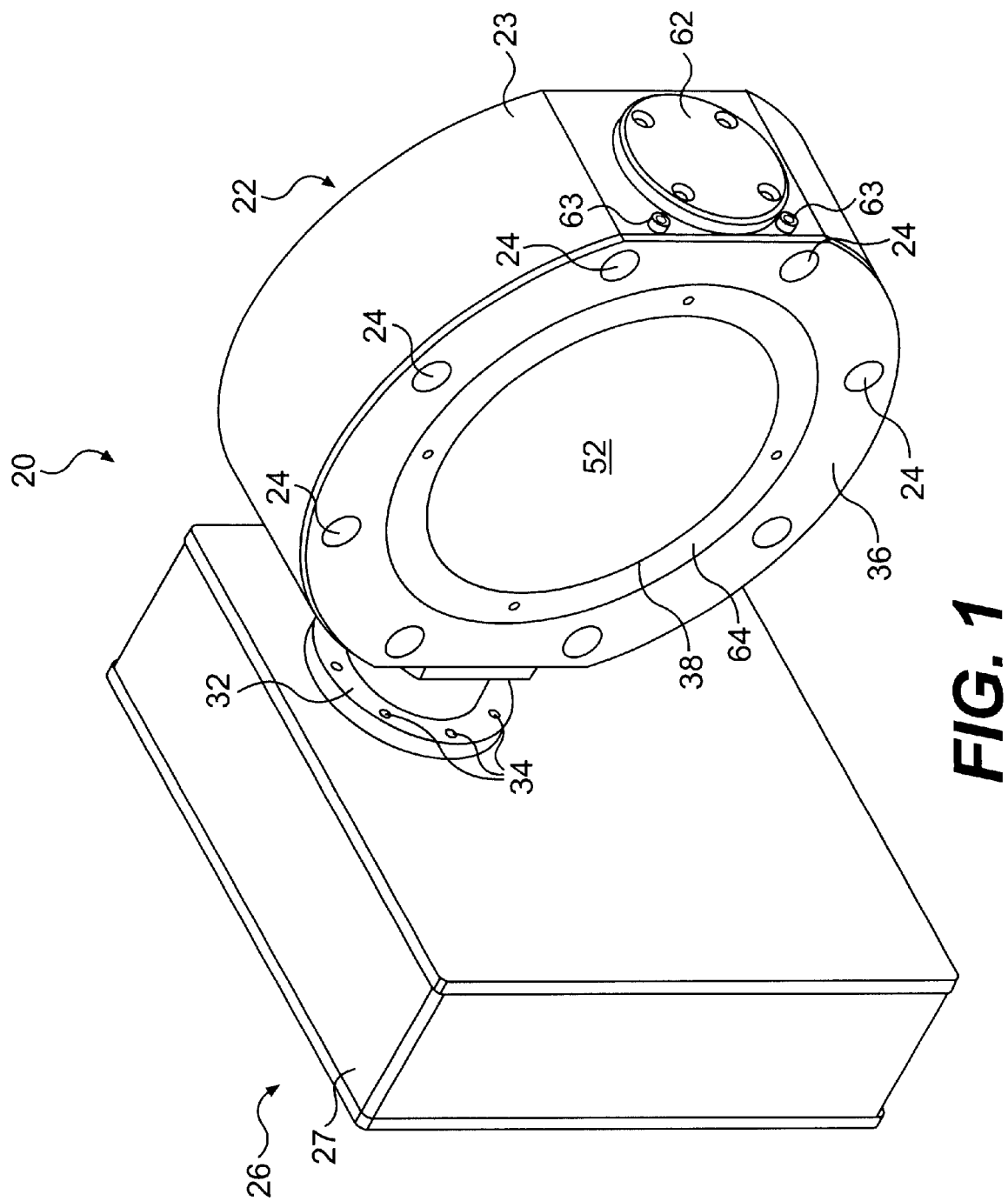
FIG. 1 is a perspective view of a pressure relief apparatus for a pressurized system according to the present invention.

Referring to FIG. 1, a pressure relief device 20 includes a pressure relief valve 22 having a body 23. Body 23 has a flange 36 that contains a series of bolt holes 24. Bolts, or other connecting devices, may be used to engage flange 36 with a corresponding pipe flange that is connected to a pressurized system (not shown).

Figure 2:
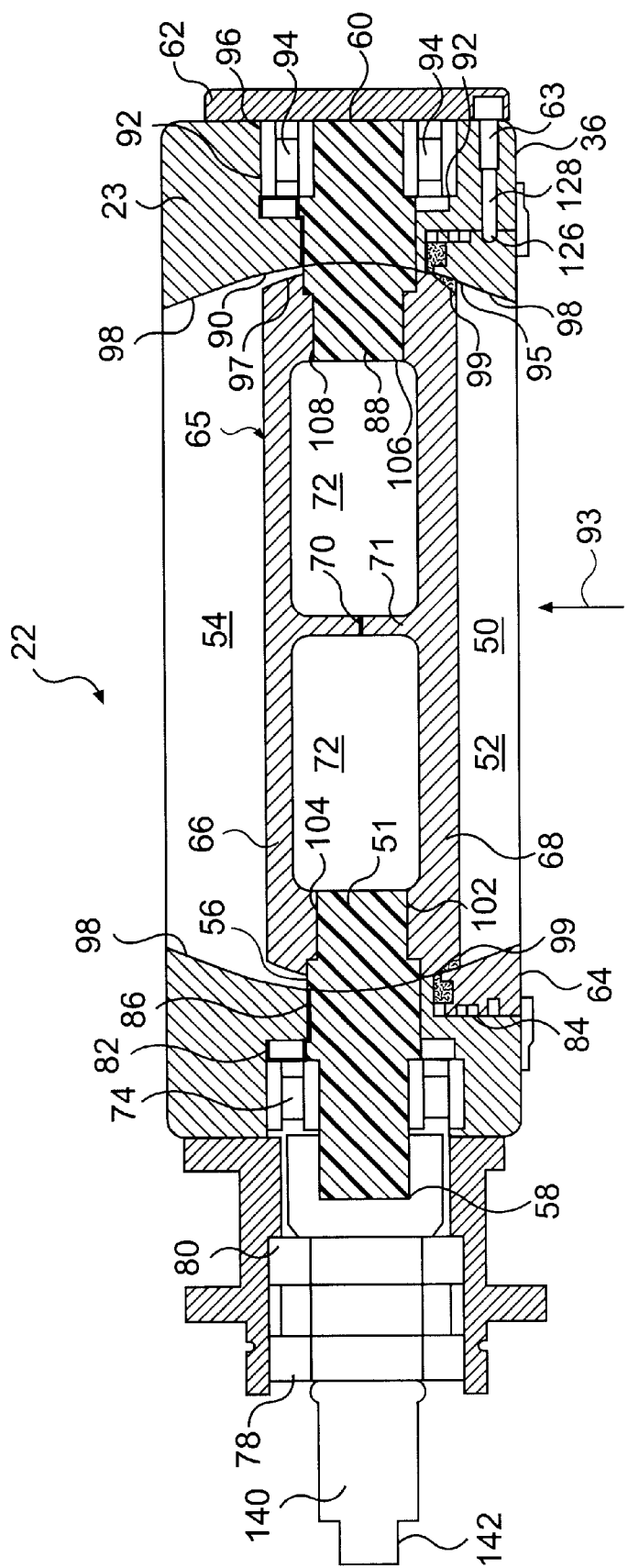
FIG. 2 is a cross-sectional view of a pressure relief valve according to the present invention, illustrating a plug in a closed position.
Figure 3:
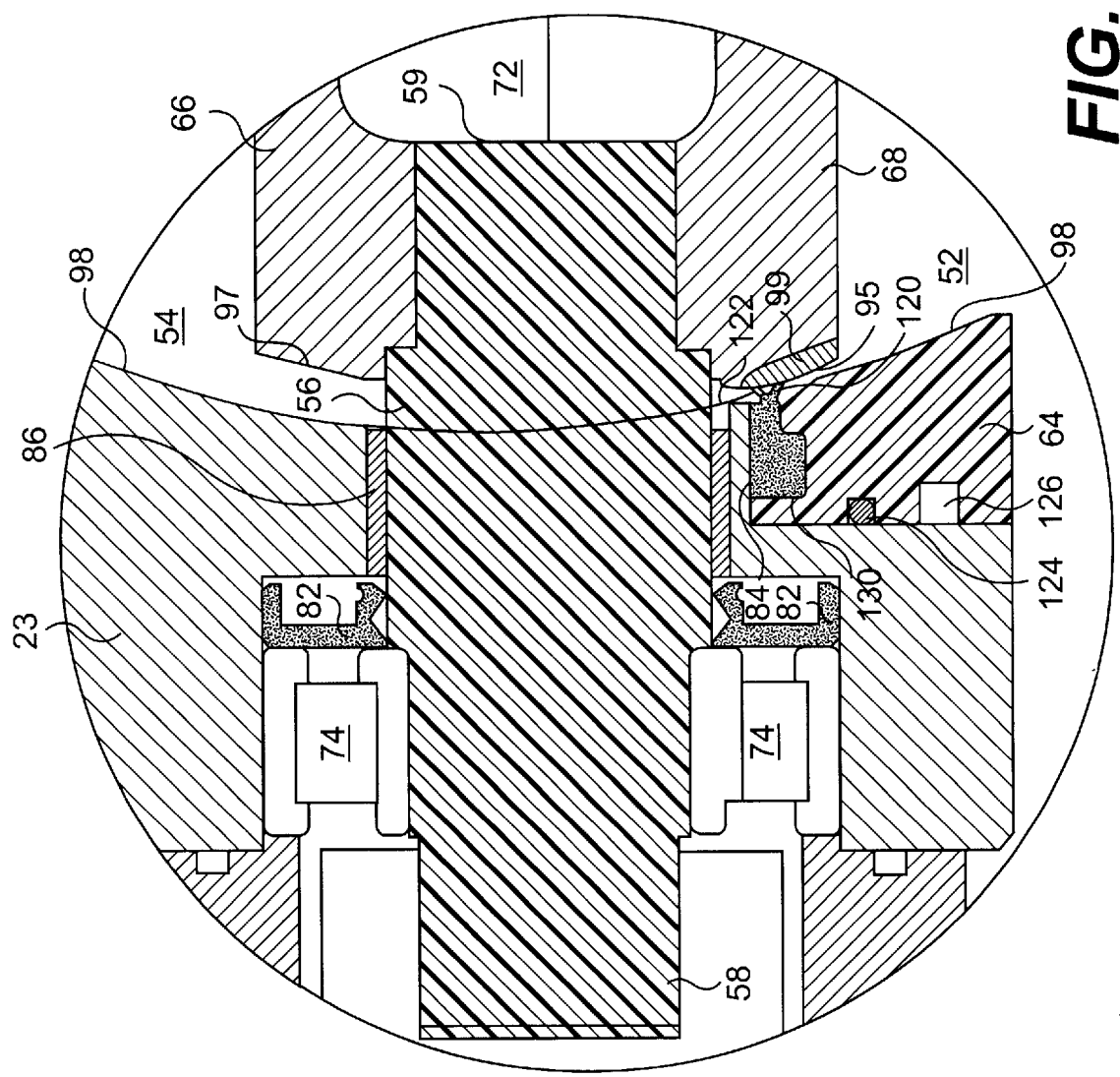
FIG. 3 is a partial cross-sectional view of the valve of FIG. 2, illustrating a shaft and a bearing in accordance with the present invention.

As illustrated in FIG. 2, a shaft 56 is rotatably mounted in body 23. Shaft 56 includes an exterior end 58 that extends through body 23 and an interior end 59 that extends into a plug 65. As shown in greater detail in FIG. 3, a bearing, such as roller bearing 74 or a bushing, is positioned between shaft 56 and body 23 to facilitate rotation of the shaft within body 23. A second shaft 60 (referring to FIG. 2) is rotatably mounted in body 23 opposite shaft 56. As with shaft 56, shaft 60 includes an interior end 88 extending into fluid flowpath 50 and a bearing, such as roller bearing 94 or a bushing, is positioned between shaft 60 and body 23 to facilitate rotation of shaft 60 within body 23.

Referring again to FIG. 2, a plug 65 is disposed within fluid flowpath 50. Preferably, the plug 65 includes opposing sides with an internal passageway therebetween. The plug includes an inlet plate 68 and an outlet plate 66 that are joined together by central projections 70 and 71 to form a crossbar that defines fluid passageways 72 between the inlet plate 68 and the outlet plate 66.

The rotational axis of plug 65 is displaced from the centerline of the plug. This offset mounting of the plug results in a greater portion of inlet plate 68 located on one side of the rotational axis than on the other side of the rotational axis. The force exerted on the inlet plate by the pressurized fluid is equal to the pressure of the fluid times the area of the plate. Since a larger area of the plate is positioned on one side of the rotational axis, the resultant force of the pressurized fluid will create a moment arm about the rotational axis that acts to rotate plug 65 and exert a torque on shafts 56 and 60. Thus, the amount of the displacement of the rotational axis of the plug from the centerline of the plug and the pressure of the fluid will determine the amount of torque exerted on the shaft. The present invention contemplates that shafts 56 and 60 may be disposed in body 23 to position the rotational axis of the plug at any location from the centerline of the plug (0% offset) to the perimeter of the plug (100% offset).

Figure 4:
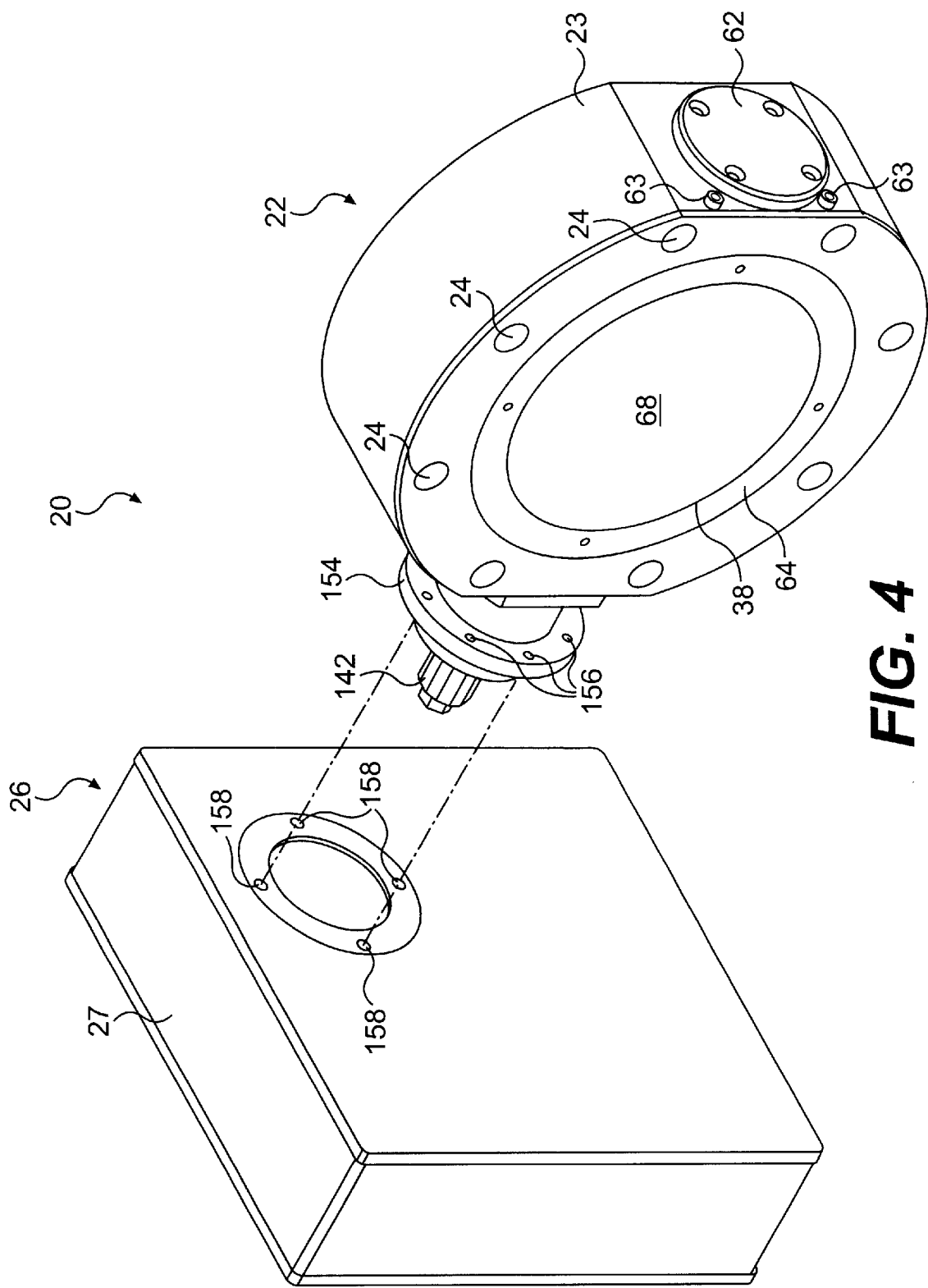
FIG. 4 is a perspective view illustrating the engagement of a valve and a linkage assembly housing according to the present invention.
Figure 5:
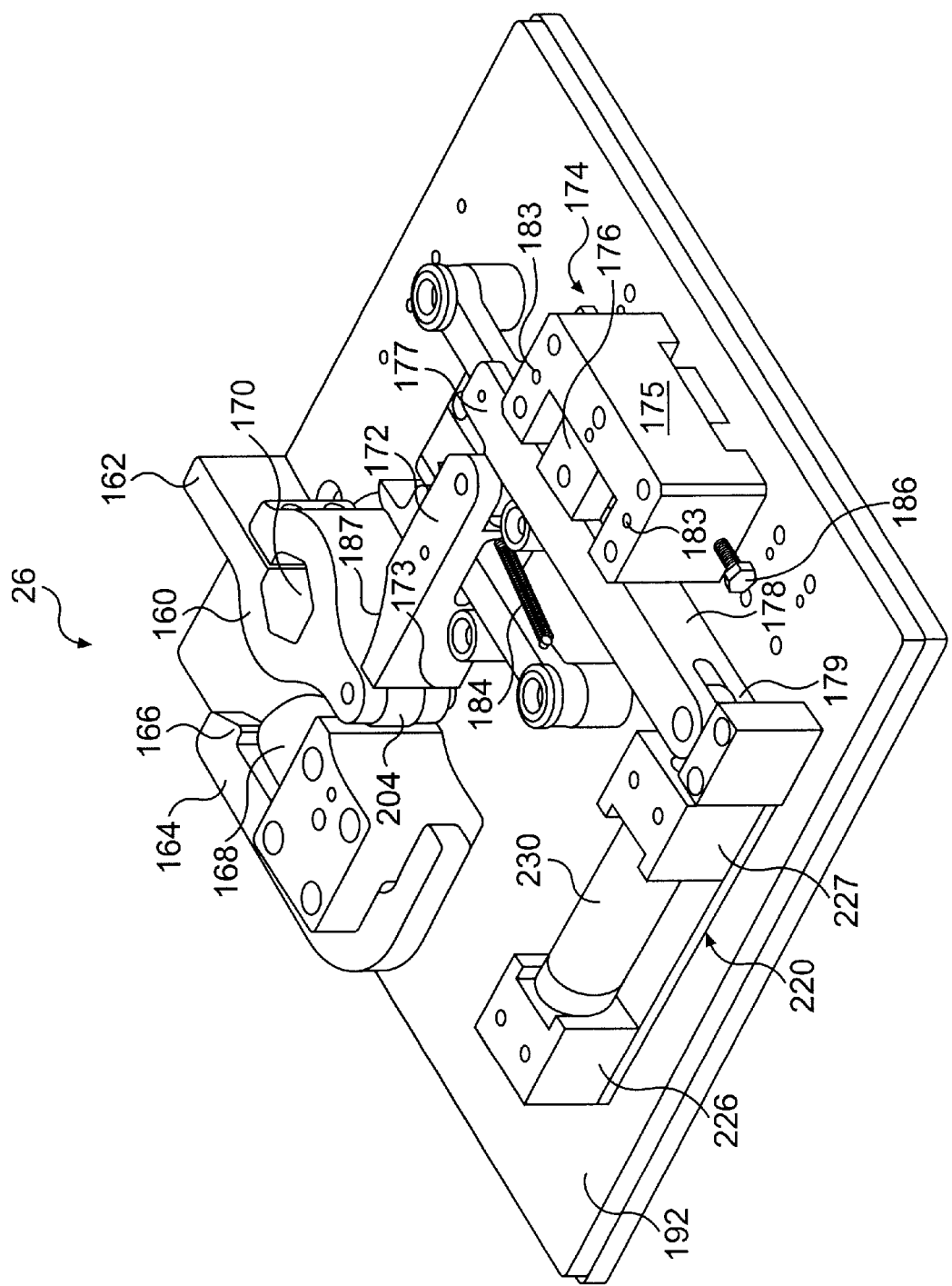
FIG. 5 is a perspective view of a linkage assembly and a cartridge assembly according to the present invention.

As illustrated in FIG. 5, a preferred embodiment of the pressure relief device includes a linkage assembly 26 engageable with the valve 22. Linkage assembly includes an input arm 160 having an opening 170 configured to receive spline 142 of spindle 140 (referring to FIGS. 2 and 4). The splined connection between spindle 140 and input arm 160 allows the linkage assembly housing to be oriented at a variety of angles with respect to the valve, while retaining a solid coupling between spline 142 and opening 170 so that any rotational movement or torque of spindle 140 is directly transferred to input arm 160. Input arm 160 is connected to trigger 172. The connection between roller 204 and trigger end 173 translates any torque applied to the input arm into a substantially linear force on the trigger 172. Trigger 172 contacts a lever arm 178. Lever arm 178 includes a first end 177 and a second end 179. Trigger 172 contacts first end 177 of the lever arm to transmit the force exerted on the trigger by the input arm against the lever arm.

Further illustrated in FIG. 5, a fulcrum 174 is disposed adjacent to the body of lever arm 178. Fulcrum 174 includes a housing 175 and an adjuster block 176. Adjuster block 176 includes a roller bearing (not shown) that contacts the body of lever arm 178 and provides a point of support about which the lever arm rotates. Thus, when the pressurized fluid exerts a torque on shaft 56, the shaft transmits the torque to input arm 160, which exerts a corresponding force on trigger 172. Trigger 172 transmits the force to first end 177 of lever arm 178. Lever arm 178 rotates about fulcrum 174 to generate an output force acting through second end 179 of lever arm 178. In this manner, the torque exerted on the shaft is translated into an output force.

Preferably, linkage assembly 26 is adjustable during set calibration of the device so that the magnitude of the output force generated by a particular torque may be easily varied. In the preferred embodiment, fulcrum 174 is moveable with respect to lever arm 178 to control the magnitude of the force exerted on a cartridge assembly 220. Even more preferably, the linkage assembly provides for major and minor adjustments of the fulcrum location. Major adjustments to the fulcrum location are made by adjusting the location of fulcrum housing 175 with respect to base plate 192. Minor adjustments to the fulcrum housing may be made by adjusting the location of adjuster block 176 within fulcrum housing 175.

In accordance with the present invention, there is provided a cartridge assembly for a pressure relief valve. The cartridge assembly includes a cartridge containing an activation component. The activation component is operatively connectible to the pressure relief valve to prevent the plug from rotating to an open position until the pressure within the system reaches a predetermined level. Preferably, the activation component is a buckling pin although the present invention contemplates that other types of activation components may also be used. Other activation components may include, inter alia, pins and other structures that are configured to deform under shear or tensile forces and/or under temperature strain. Alternatively, activation components may be temperature sensitive elements that in response to an increase in the surrounding temperature liquify to allow the plug to rotate toward the open position. Furthermore, the present invention contemplates an automatically resetting activation component, such as a spring, that will return the plug to the closed position when the system pressure decreases below the predetermined level.

As illustrated in FIGS. 6 and 7, cartridge assembly 220 includes a replaceable cartridge 230. Replaceable cartridge 230 includes a hollow tube 210 with two open ends 211 and 212. Preferably, hollow tube 210 is made of a transparent material to permit a visual inspection of a buckling pin 216 although other non-transparent material may also be used. A fixed end cap assembly 214 and 215 is mounted on first open end 211. A second end cap 218 is positioned in second open end 212. Buckling pin 216 is disposed within tube 210 and is secured between end cap assembly 214 and 215 and second end cap 218. Preferably, the outer diameter of second end cap 218 is smaller than the inner diameter of tube 210 so that second end cap 218 is free to slide within tube 210 when buckling pin 216 starts to deform. More preferably, the outer diameter of second end cap 218 is selected to provide a snug interference fit within tube 210.

Preferably, cartridge 230 includes an adjustable holder 214. Adjustable holder 214 has a threaded shank portion 240 and a pin seat hole 244. Pin seat hole 244 receives and secures buckling pin 216 to adjustable holder 214. In turn, threaded shank portion 240 engages a threaded bore 242 to secure adjustable holder 214 to fixed end cap 215. Threaded shank portion 240 may either partially or fully engage threaded bore 242 to vary the distance between adjustable holder 214 and end cap. In this manner, cartridge 230 may accommodate buckling pins having different lengths. The present invention, however, contemplates cartridge 230 without adjustable holder 214 where fixed end cap 215 is provided with a pin seat hole 244.

Second end cap 218 has a pin seat hole 246 (referring to FIG. 8) similar to pin seat hole 244 in adjustable holder 214. Preferably, buckling pin 216 is secured within pin seat holes 244 and 246 by a tight interference fit. Alternatively, buckling pin 216 may be secured within pin seat holes 244 and 246 by adhesives or welding. The present invention further contemplates that adjustable holder 214, buckling pin 216 and second end cap 218 may be machined from one solid piece. Adjustable holder 214, buckling pin 216 and second end cap 218 then become an integral unit that eliminates the need for separately attaching buckling pin 216 to adjustable holder 214 and second end cap 218 by interference fit, adhesives, or welding.

Buckling pin 216 may be made of a noble material if cartridge 230 is to be utilized in a corrosive environment.

Alternatively, cartridge 230 may be modified to provide a sealed enclosure for a non-noble buckling pin in a corrosive environment. A sealed enclosure may be achieved by providing o-rings and corresponding grooves on end caps 215 and 218. The o-rings making seal-tight contacts with tube 210 for a sealed enclosure to isolate buckling pin 216 from the corrosive environment. Inert gases such as helium, neon or argon may be added to the sealed cartridge for further corrosion protection.

Part of cartridge 230 may be made of a fusible alloy which in response to an increase in the surrounding temperature will liquify to allow a movement of second end cap 218. Either or both end caps 215 and 218 may be partly made from a fusible alloy. Alternatively, buckling pin 216 may be welded to either end caps 215 and 218 by a fusible alloy. The present invention further contemplates that buckling pin 216 may be, wholly or partly, made of a fusible alloy. Preferably, the fusible alloy is eutectic to provide a single temperature set point at which end cap 218 will move, although the present invention contemplates that non-eutectic alloy may also be used. The present invention contemplates that a fusible alloy will liquify in response to an emergency situation such as a fire. Alternatively, a heating element may be provided near the fusible alloy which on demand by an operator will liquify the fusible alloy to allow a movement of second end cap 218.

Figure 12:
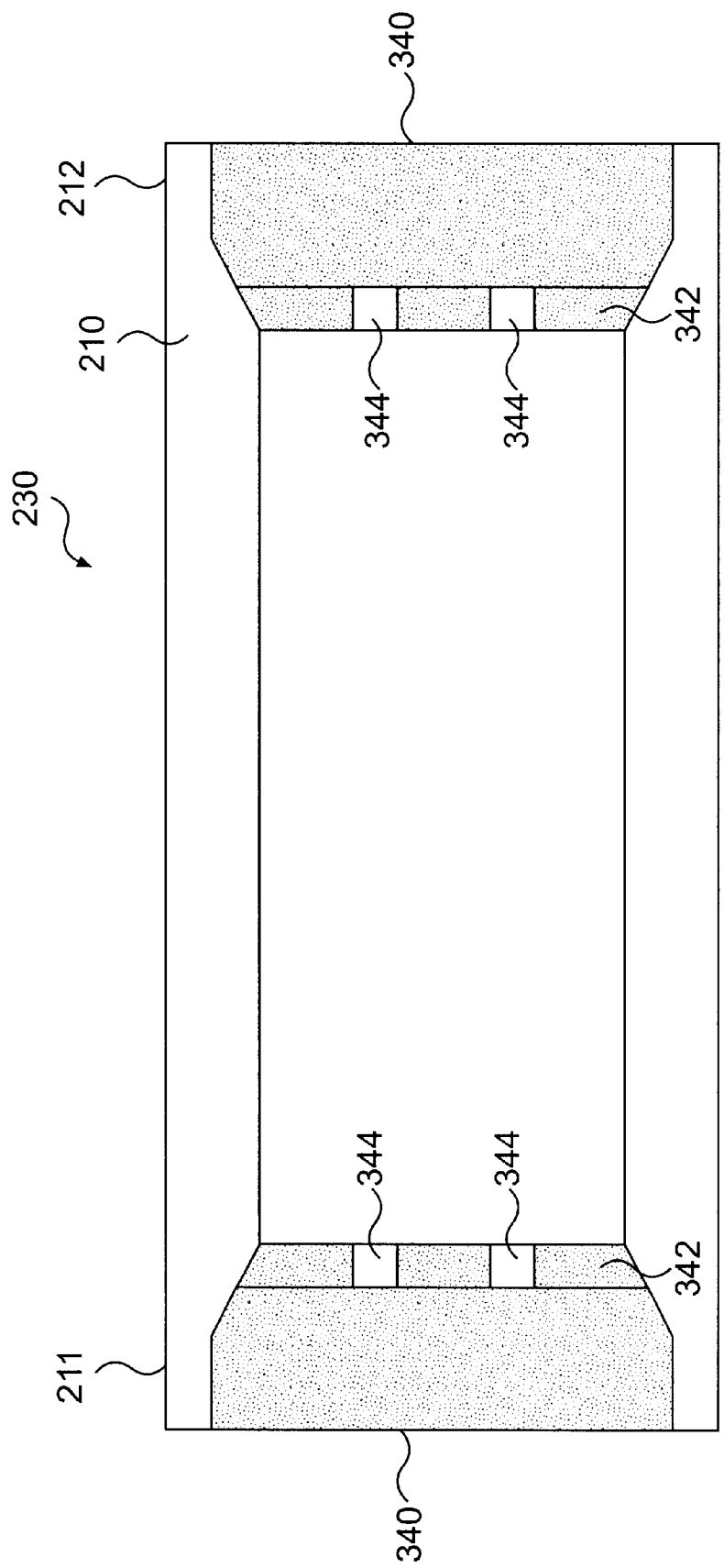
FIG. 12 is a section view of a cartridge according to the present invention, illustrating an activation component that includes a fusible alloy.

The present invention further contemplates a cartridge that has an activation component based solely on a fusible alloy that liquifies when exposed to a certain temperature. Referring to FIG. 12, cartridge 230 includes a fusible alloy 340. A support plate 342 that includes a series of perforations 344 is disposed on one side of fusible alloy 340. Support plate 342 may be integral with hollow tube 210 or a separate piece that mates with hollow tube 210. Fusible alloy 340 may be provided on both ends 211 and 212 although the present invention contemplates fusible alloy 240 provided only on one of ends 211 and 212 with the other end being mounted with end cap 215 (referring to FIG. 6).

When the temperature of cartridge 230 increases to a certain level in response to heat generated by a heating element (not shown) or an emergency situation, such as a fire, fusible alloy 340 liquifies. The liquified fusible alloy 340 flows through perforations 344 or out of hollow tube 210, thereby allowing an actuator 231 (referring to FIG. 6 and explained in detail below) or a valve stem 308 (referring to FIGS. 10 and 11 and explained in detail below) to move into hollow tube 210. The heating element may be actuated on demand by an operator.

In accordance with the present invention, a support structure is provided to receive and hold the cartridge. Engagement of the cartridge with the support structure operatively connects the activation component with the pressure relief valve.

Referring to FIG. 6, cartridge assembly 220 includes a support structure 225. Support structure 225 includes a first block 226, a second block 227 and a base plate 193. Bolts, or other conventional connecting devices, may be used to engage blocks 226 and 227 to base plate 193. Base plate 193 in turn attaches to base plate 192 (referring to FIG. 5) by bolts or other conventional devices.

First block 226 includes a recess 221 that slidably receives and secures fixed end cap 215. Similarly, second block 227 includes a recess 222 that slidably receives and secures second open end 212 of hollow tube 210 and second end cap 218. Preferably, fixed end cap 215 and second open end 212 containing second end cap 218 are fittingly received in their respective recesses 221 and 222. This fitting engagement allows a free axial movement of cartridge 230 into and out of recesses 221 and 222 for easy installation and removal. The fitting engagement, however, prevents a lateral movement of cartridge 230 within recesses 221 and 222, which might result in an accidental dislodging of cartridge 230 from support structure 225.

Preferably, fixed end cap 215 and its corresponding recess 221 are larger than second open end 212 and its corresponding recess 222 so that fixed end cap 215 can only be received within the recess 221. The size difference between the recesses 221 and 222 ensures that the cartridge 230 is properly orientated when mounted on support structure 225. The present invention contemplates alternative structures, such as differently shaped recesses 221 and 222 and corresponding end cap 215 and open end 212 to ensure a proper orientation of cartridge 230 when cartridge 230 is engaged with support structure 225. The present invention further contemplates a symmetrical cartridge with movable end caps such as second end cap 218 on both open ends 211 and 212 for a fail safe mounting within support structure 225.

Referring again to FIG. 6, second block 227 includes a bore 233 through which an actuator 231 is slidably received. Actuator 231 include an enlarged end portion 234 and an elongated center portion 235. A pair of bushings 232 are fittingly received within bore 233. Elongated center portion 235 of actuator 231 is slidably received within bore 233 through a pair of bushings 232 so that enlarged end portion 234 is adjacent to second end cap 218 when cartridge 230 is mounted on support structure 225.

Figure 8:
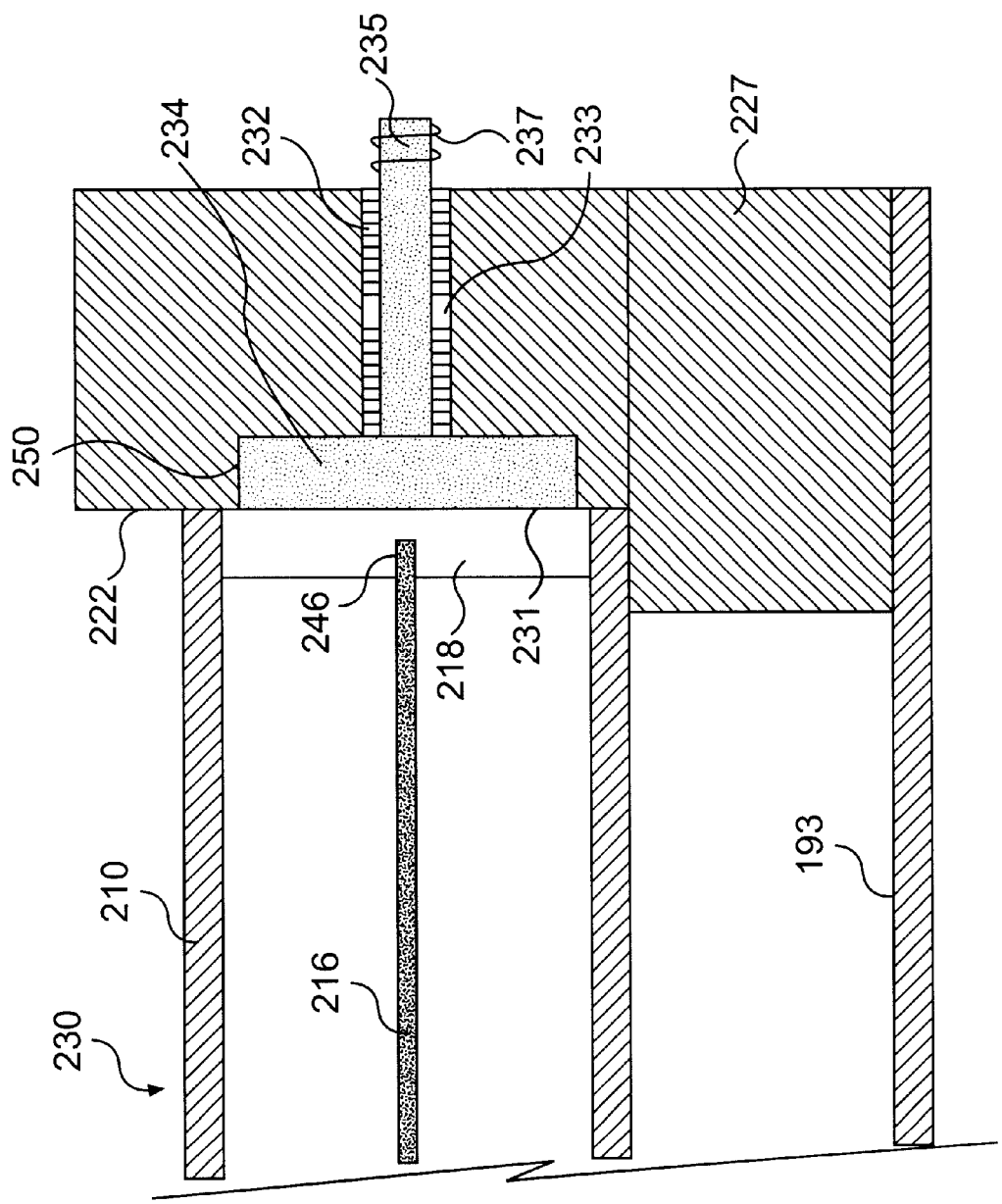
FIG. 8 is a partial section view of a cartridge and a support structure shown in FIGS. 6 and 7, taken between and in the direction of arrows 8—8 in FIG. 7, according to the present invention.

Referring to FIG. 8, second block 227 includes a recess 250 which receives enlarged end portion 234 of actuator 231. Preferably, recess 250 is sized such that enlarged end portion 234 does not extend out into recess 222. This ensures that actuator 231 does not hinder the removal and installation of cartridge 230.

Elongated center portion 235 of actuator 231 extends out of bore 233 to transmit the force exerted on lever arm 178 (referring to FIG. 5) to buckling pin 216 via second end cap 218. Preferably, the outer diameter of enlarged end portion 234 is smaller than, or at most equal to, the outer diameter of second end cap 218 to ensure that actuator 231 is free to move within tube 210 when buckling pin 216 starts to deform.

A small hole (not shown) may be provided in elongated center portion 235 to secure a spring 237 around elongated center portion 235 after actuator 231 assumes the position shown in FIG. 8. The spring will automatically return actuator 231 out of tube 210 after buckling pin 216 deforms and the force acting on actuator 231 is removed. The spring around elongated center portion is desirable especially if there is little space between block 227 and second end 179 (referring to FIG. 5) to manually pull actuator 231 out of tube 210.

Figure 9:
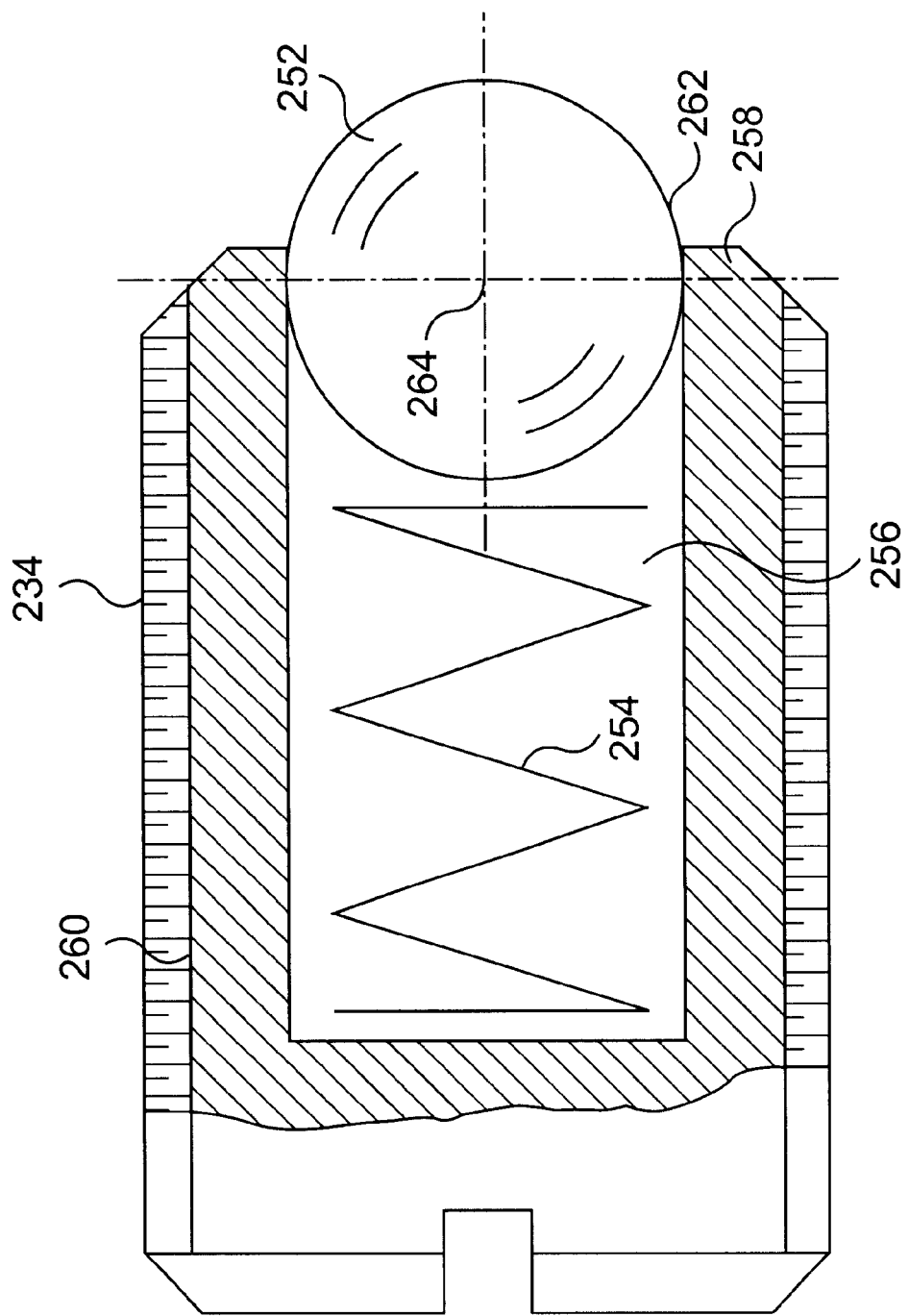
FIG. 9 is a partial section view of a spring ball according to the present invention.

Referring to FIG. 9, a threaded spring ball 239 includes a bore 256. A spring 254 biases a ball 252 so that portion of ball 252 extends out of the edge 258 of bore 256. Edge 258 contacts the surface of ball 252 past the center 264 of ball 252. The inside surface 262 of bore 256 at edge 258 is slightly curved inwardly corresponding to the curvature of ball 252. Ball 252 is free to move within bore 256 when the force exerted on ball 252 overcomes the biasing force exerted by spring 254. However, the curvature of inside surface 262 and the position of edge 258 prevent ball 252 from falling out of bore 256. Threads 260 are provided on the outer surface of spring ball 239.

Referring again to FIG. 6, first block 226 includes a threaded bore 236. Threads 260 on spring ball 239 are configured to engage threaded bore 236. Once threaded with ball 252 protruding out of bore 236, a biasing force provided by spring 254 in spring ball 239 secures cartridge 230 within support structure 225. A small recess (not shown) configured to engage ball 252 may be provided on the outer surface of fixed end cap 215 to ensure that cartridge 230 is centered within support structure 225.

Preferably, actuator 231 exerts a compressive force on buckling pin 216. The present invention contemplates, however, that actuator 231 and a corresponding linkage assembly 26 (referring to FIG. 5) may be arranged to generate a tensile or shear force. A shear pin may replace buckling pin 216 when a shear force is generated through actuator 231. A tension pin may replace buckling pin 216 when a tensile force is generated through actuator 231. The present invention further contemplates that an automatically resetting activation component, such a spring, may replace buckling pin 216. The automatically resetting activation component automatically returns plug 65 to the closed position when the system pressure is decreased below a predetermined level.

The present invention further contemplates that the surface of fixed end cap 215, or some other portion of cartridge 230, is marked with industry code-symbol stamps to indicate a compliance with relevant code requirements. Also, a valve serial number may be marked on the surface of fixed end cap 215, or some other portion of cartridge 230, to indicate the valve for which the cartridge 230 is designed.

The operation of the aforementioned pressure relief apparatus and cartridge assembly will now be described with reference to the attached drawings. Although the following describes a cartridge assembly with a bucking pin, it should be noted that the present invention also contemplates an automatic resetting activation component, such as a spring, replacing the buckling pin in the cartridge assembly. As previously mentioned, an automatic resetting activation component automatically returns the plug to its closed position from its open position when the system pressure decreases below a predetermined value. Furthermore, it should also be noted that the present invention contemplates that a cartridge shown in FIG. 12 with only a fusible alloy may replace a cartridge shown in FIG. 6 with a buckling pin. As previously mentioned, the fusible alloy liquifies in response to heat generated either by an heating element or by an emergency situation, such as a fire. The heating element may be actuated on demand by an operator.

Referring to FIG. 1, valve 22 of the pressure relief apparatus 20 is engaged with a pipe flange of a pressurized system by engaging bolts through bolt holes 24 and the corresponding bolt holes of the system flange. Operation of the pressurized system directs pressurized fluid into fluid inlet 52 of body 23.

Referring to FIG. 2, the pressurized fluid exerts a force on inlet plate 68 of plug 65. Because the rotational axis of the plug is offset from the center of the plug, the resultant force exerted by the pressurized fluid on inlet plate 68 creates a moment about the rotational axis of the plug and exerts a torque on shaft 56.

The torque on shaft 56 is translated through spindle 140 to input arm 160 of linkage assembly 26 (referring to FIGS. 4 and 5). The torque on input arm 160 is translated into a linear force on trigger 172. Trigger 172 transfers the linear force onto lever arm 178, which exerts a corresponding force on actuator 231.

When the force exerted on buckling pin 216 via actuator 231 exceeds the buckling strength of the material, buckling pin 216 deforms or buckles to trigger the opening of the valve. The deformation of buckling pin 216 releases lever arm 178, which, in turn, releases trigger 172. Release of trigger 172 frees input arm 160 and allows shaft 56 and plug 65 to rotate. The pressurized fluid continues to exert a force on inlet plate 68 of plug 65 causing plug 65 to rotate toward the open position. As the plug rotates, fluid is allowed to escape from the system through valve outlet 54. When plug 65 rotates to the fully open position, passageways 72 become substantially aligned with the flow of fluid. Thus, the plug of the present invention provides a large flowpath through which fluid may escape, thereby providing an efficient flowpath with a low coefficient of resistance.

After the fluid has vented from the system and the pressure reduced, the pressure relief apparatus may be reset. With plug 65 rotated to the open position, cartridge 230 is replaced by pulling actuator 231 out of tube 210 manually or automatically by spring 237. Once actuator 231 is pulled out of tube 210, cartridge 230, including deformed buckling pin 216, is removed from support structure 225 as a unit. A new cartridge 230 corresponding to the pressure requirement of the application drops into recesses 221 and 222. A valve serial number marked on fixed end cap 215, or some other portion of cartridge 230, helps maintenance personnel to select an appropriate cartridge for the system. The size or shape difference between fixed end cap 215 and second open end 212 assures that maintenance personnel properly orientate cartridge 230 so that second end cap 218 is next to actuator 231. Recess 222 which is sized to fittingly receive smaller second open end 212 cannot fittingly receive larger fixed end cap 215. Alternatively, a cartridge with two movable end caps on both open ends 211 and 212 provides a fail-safe orientation.

Once a new cartridge 230 is installed, the pressure relief apparatus can be reset. This is accomplished by returning input arm 160 to the starting position. A wrench or socket may be engaged with spindle 140 to aid in returning the plug to a closed position. With plug 65 rotated back to the closed position, the trigger 172 is manually reset.

For routine maintenance and inspection of valve 22, cartridge 230 is removed from support structure 225 manually. Once cartridge 230 is removed, system components including valve 22 and linkage assembly 26 may be inspected and manually turned through an open and closed cycle without the risk of damaging buckling pin 216. After the completion of inspection and maintenance of system components, cartridge 230 is remounted on support structure 225 to return the system to the normal operating condition.

Figure 10:
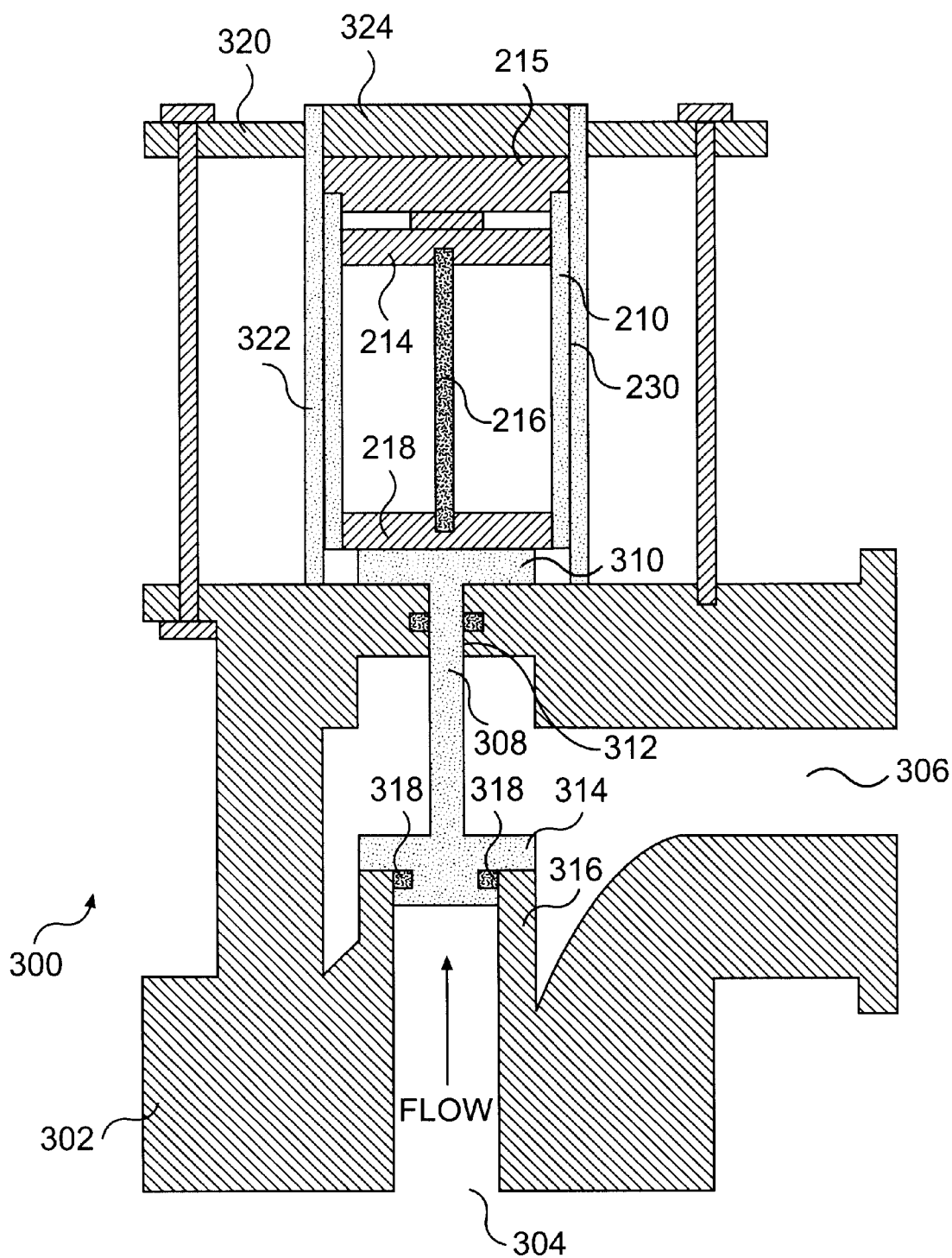
FIG. 10 is a section view of a pressure relief valve and a cartridge assembly according to the present invention.
Figure 11:
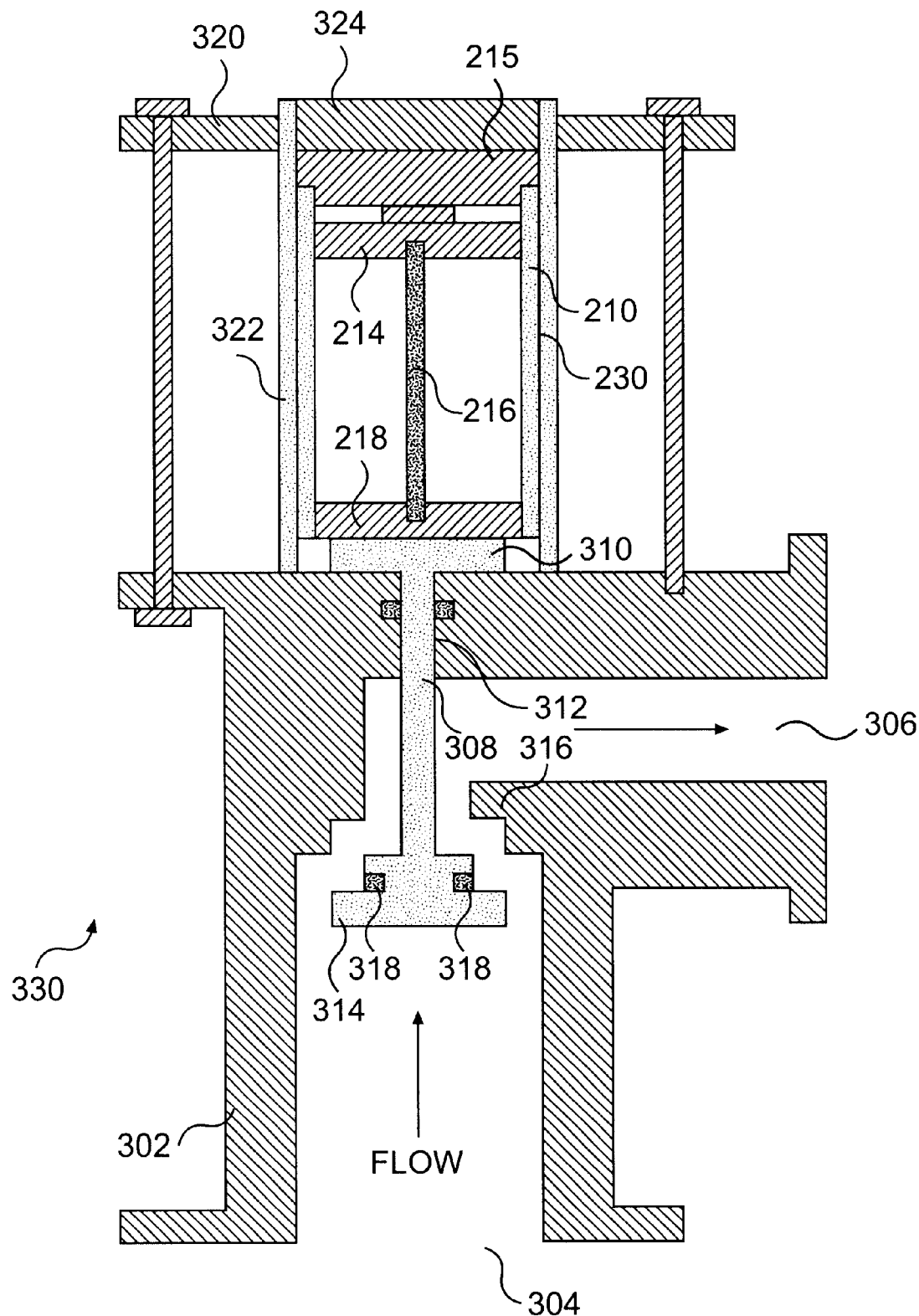
FIG. 11 is a section view of a shut-off valve and a cartridge assembly according to the present invention.

As mentioned previously, it is contemplated that the cartridge assembly of the present invention may be used with other types of pressure-activated devices. Exemplary embodiments of alternative pressure-activated devices are illustrated in FIGS. 10 and 11. FIG. 10 illustrates another pressure relief device and FIG. 11 illustrates a pressure-activated shut-off valve.

Referring to FIG. 10, a pressure relief valve 300 includes a valve body 302 with a flow inlet 304 and a flow outlet 306. A bore 312 slidably receives a valve stem 308. Valve stem 308 includes a plug 314. Plug 314 engages with a valve seat 316. O-ring 318 provide a fluid-tight seal between plug 314 and valve seat 316. A flange 310 is attached to valve stem 308 outside valve body 302.

Flange 310 contacts end cap 218 to transmit the pressure exerted on plug 314 to cartridge 230. A support structure 320 includes a cylinder 322 to hold cartridge 230 in place. Preferably, cylinder 322 is made of a transparent material to permit a visual inspection of buckling pin 216 although other non-transparent material may also be used. A cap 324 encloses cartridge 230 within cylinder 322. Cap 324, which can be detachably attached to cylinder 322 by any conventional technique, applies a small pre-load to cartridge 230. The small pre-load ensures that plug 314 engages valve seat 316 properly and that fluid pressure exerted on plug 314 is transmitted to buckling pin 216 directly. Although FIG. 10 illustrates cylinder 322 and cap 324 to hold cartridge 230 in place, the present invention contemplates other support structures to hold cartridge 230.

Plug 314 maintains the normally-closed position of FIG. 10 until a predetermined pressure is exerted by the fluid flow at flow inlet 304 to plug 314. When the pressure exerted on plug 314 reaches the predetermined pressure, buckling pin 216 starts to deform. As buckling pin 216 starts to deform, the fluid pressure pushes plug 314 to cause flange 310 and valve stem 308 into cartridge 230 and opens the passage to flow outlet 306.

As previously mentioned, an automatic resetting activation component, such as a spring, may replace buckling pin 216. An automatic resetting activation component automatically returns plug 314 to its closed position from its open position when the pressure exerted on plug 314 decreases below the predetermined level. Furthermore, it should be noted that the present invention contemplates that a cartridge with only a fusible alloy shown in FIG. 12 may replace a cartridge shown in FIG. 6. As previously mentioned, the fusible alloy liquifies in response to heat generated either by an heating element or by an emergency situation, such as a fire. The heating element may be actuated on demand by an operator.

The present invention contemplates alternative configurations of plug 314 and valve stem 308 that provide a range of traditional valve capabilities, such as a valve insensitive to back pressure from flow outlet 306. In each configuration, however, the activation component is provided in a cartridge form.

Referring to FIG. 11, a shut-off valve 330 includes a valve body 302 with a flow inlet 304 and a flow outlet 306. A bore 312 slidably receives a valve stem 308. Valve stem 308 includes a plug 314. Plug 314 is engageable with a valve seat 316. O-ring 318 provide a fluid-tight seal between plug 314 and valve seat 316 when they are engaged. A flange 310 is attached to valve stem 308 outside valve body 302.

Flange 310 contacts end cap 218 to transmit the pressure exerted on plug 314 to cartridge 230. A support structure 320 includes a cylinder 322 to hold cartridge 230 in place. Preferably, cylinder 322 is made of a transparent material to permit a visual inspection of buckling pin 216 although other non-transparent material may also be used. A cap 324 encloses cartridge 230 within cylinder 322. Cap 324, which can be detachably attached to cylinder 322 by any conventional technique, applies a small pre-load to cartridge 230. The small pre-load ensures that shut-off valve 330 properly assumes a fully open position shown in FIG. 11 and that fluid pressure exerted on plug 314 is transmitted to buckling pin 216 directly. Although FIG. 11 illustrates cylinder 322 and cap 324 to hold cartridge 230 in place, the present invention contemplates other support structures to hold cartridge 230.

Plug 314 maintains the normally-open position of FIG. 11 until a predetermined pressure is exerted by the fluid flow. When the pressure exerted on plug 314 reaches the predetermined pressure, buckling pin 216 starts to deform. As buckling pin 216 starts to deform, the fluid pressure pushes plug 314 to cause flange 310 and valve stem 308 to move into cartridge 230. The passage between flow inlet 304 and flow outlet 306 is closed when plug 314 engages valve seat 316. Preferably, plug 314 and valve seat 316 are configured to promote a fluid-tight seal.

As previously mentioned, an automatic resetting activation component, such as a spring, may replace buckling pin 216. An automatic resetting activation component automatically returns plug 314 to its open position from its closed position when the pressure exerted on plug 314 decreases below the predetermined level. Furthermore, it should be noted that the present invention contemplates that a cartridge with only a fusible alloy shown in FIG. 12 may replace a cartridge shown in FIG. 6. As previously mentioned, the fusible alloy liquifies in response to heat generated either by an heating element or by an emergency situation, such as a fire. The heating element may be actuated on demand by an operator.

Referring to FIGS. 10 and 11, after plug 304 returns to the normally-closed (FIG. 10) or the normally-open position (FIG. 11), cartridge 230 may be replaced. After cap 324 is disconnected from cylinder 322, cartridge 230, including deformed buckling pin 216, is removed from support structure 320 as a unit. A new cartridge 230 corresponding to the particular pressure requirement of the valve drops into cylinder 322. A valve serial number marked on fixed end cap 215, or some other portion of cartridge 230, helps maintenance personnel to select an appropriate cartridge for the valve. After the new cartridge 230 drops into cylinder 322, cap 324 is connected to return the valve to its normal operating condition.

For routine maintenance and inspection of valves 300 and 330, cartridge 230 is removed from support structure 320. Once cartridge 230 is removed, valve components may be inspected and defective parts replaced without the risk of damaging buckling pin 216. After the completion of maintenance and inspection of valve components, cartridge 230 is remounted on support structure 320 to return the valve to its normal operating condition.

Thus, the cartridge assembly of the present invention obviates the care and control required by maintenance personnel in tightening a bare buckling pin in place. Furthermore, The cartridge assembly of the present invention eliminates the possibility of pin failure resulting from maintenance personnel contacting the bare buckling pin during installation. The ease of installation and removal of the cartridge leads to a significant time saving compared with a conventional bare buckling pin.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief device for a system containing a pressurized fluid, comprising:
   a rotatable plug engageable with the system to expose the plug to the pressurized fluid, the fluid acting on the plug to rotate the plug from a closed position to an open position;
   an activation component operatively connectible to the plug, the activation component configured to prevent the plug from rotating until a predetermined pressure is exerted on the plug;
a cartridge having a hollow body with a first and second end, the hollow body substantially enclosing the activation component so that the cartridge and the activation component are replaceable without any contact with the activation component and without replacing the plug; and
a support member configured to receive the cartridge to operatively connect the activation component with the plug.

2. The device of claim 1, wherein the activation component is a buckling pin configured to buckle when the system reaches the predetermined pressure.

3. The device of claim 1, wherein the activation component is configured to return the plug to the closed position from the open position when the pressure exerted on the plug decreases below the predetermined pressure.

4. The device of claim 3, wherein the activation component includes a spring to automatically reset the activation component.

5. The device of claim 2, wherein the cartridge includes a first end cap mounted on the first end and a slidably mounted second end cap, the first and second end caps securing the buckling pin therebetween.

6. The device of claim 5, wherein the first end cap, the second end cap and the buckling pin are an integral unit machined from one solid piece.

7. The device of claim 1, wherein the cartridge is marked with a industry code symbol stamp.

8. The device of claim 1, wherein the cartridge is marked with a valve serial number.

9. The device of claim 2, wherein the cartridge further includes an adjustable holder to accommodate buckling pins of variable lengths.

10. The device of claim 5, wherein the support structure includes a first recess sized to fittingly receive the first end cap and a second recess sized to fittingly receive the second end of the hollow body.

11. The device of claim 10, wherein the first end cap and the second end of the hollow body are of different sizes to ensure the hollow member is properly orientated.

12. The device of claim 11, wherein the first end cap is larger than the second end of the hollow body.

13. The device of claim 10, wherein the first end cap and the second end of the hollow body are of different shape to ensure the hollow member is properly orientated.

14. The device of claim 1, wherein the cartridge includes a pair of slidably mounted end caps.

15. The device of claim 1, wherein the hollow body is substantially transparent.

16. The device of claim 5, wherein the activation component is made of a non-noble material.

17. The device of claim 16, wherein the hollow body, the first and second end caps form a sealed enclosure.

18. The device of claim 17, wherein the sealed enclosure is filled with an inert gas.

19. The device of claim 1, wherein the activation component is made of a noble material.

20. The device of claim 1, wherein part of cartridge is made of a fusible alloy.

21. The device of claim 1, wherein the activation component is made of a fusible alloy.

22. The device of claim 5, wherein the activation component is welded to one of the end caps with a fusible alloy.

23. The device of claim 22, wherein the activation component is welded to both of the end caps with a fusible alloy.

24. The device of claim 22, wherein an heating element is provided to liquify the fusible alloy on demand.

25. The device of claim 1, further comprising an actuator configured to exert a force on the activation component corresponding to the pressure of the fluid within the system.

26. The device of claim 25, wherein a spring is attached to the actuator.

27. The device of claim 1, further comprising a spring ball securing the cartridge within the support member.

28. The device of claim 25, wherein the actuator exerts a compressive force on the activation component.

29. The device of claim 25, wherein the actuator exerts a tensile force on the activation component.

30. The device of claim 25, wherein the actuator exerts a shear force on the activation component.

31. A cartridge assembly for a valve containing a member movable between a first position and a second position, comprising:
an activation component operatively connectible with the valve to prevent the member from moving from the first position to the second position until a predetermined pressure is exerted on the valve;
a cartridge having a hollow body with a first and second end, the hollow body substantially enclosing the activation component so that the cartridge and the activation component are replaceable as a unit without any contact with the activation component and without replacing the member; and
a support structure engageable with the cartridge to operatively connect the activation component with the valve.

32. The assembly of claim 31, wherein the valve is a pressure relief valve with the first position being a closed position and the second position being an open position.

33. The assembly of claim 32, wherein the member is a rotatable plug.

34. The assembly of claim 32, wherein the member is a slidable valve stem.

35. The assembly of claim 31, wherein the activation component is a buckling pin configured to buckle when the predetermined pressure is exerted on the valve.

36. The assembly of claim 31, wherein the activation component is configured to return the member to the first position from the second position when the pressure exerted on the valve decreases below the predetermined pressure.

37. The assembly of claim 36, wherein the activation component includes a spring to automatically reset the activation component.

38. The assembly of claim 31, wherein the cartridge is marked with an industry code symbol stamp.

39. The assembly of claim 31, wherein the cartridge is marked with a valve serial number.

40. The assembly of claim 35, wherein the cartridge includes a first end cap mounted on the first end and a second slidably mounted end cap.

41. The assembly of claim 40, further comprising an adjustable holder to accommodate buckling pins of variable lengths.

42. The assembly of claim 41, wherein the adjustable holder, the buckling pin and the second end cap are an integral unit machined from one solid piece.

43. The assembly of claim 40, wherein the support structure includes a first recess sized to fittingly receive the first end cap and a second recess sized to fittingly receive the second end of the hollow body.

44. The assembly of claim 43, wherein the first end cap and the second end of the hollow body are of different sizes to ensure the cartridge is orientated properly.

45. The assembly of claim 44, wherein the first end cap is larger than the second end of the hollow body.

46. The assembly of claim 43, wherein the first end cap and the second end of the hollow body are of different shapes to ensure the cartridge is orientated properly.

47. The assembly of claim 31, wherein the cartridge includes a pair of slidably mounted end caps.

48. The assembly of claim 31, wherein a spring ball secures the cartridge within the support structure.

49. The assembly of claim 31, wherein the hollow body is substantially transparent.

50. The assembly of claim 40, wherein the activation component is made of a non-noble material.

51. The assembly of claim 50, wherein the hollow body, the first and second end caps form a sealed enclosure.

52. The assembly of claim 51, wherein the sealed enclosure is filled with an inert gas.

53. The assembly of claim 31, wherein the activation component is made of a noble material.

54. The assembly of claim 31, wherein part of the cartridge is made of a fusible alloy.

55. The assembly of claim 31, wherein the activation component is made of a fusible alloy.

56. The assembly of claim 40, wherein the activation component is welded to one of the end caps with a fusible alloy.

57. The assembly of claim 56, wherein the activation component is welded to both of the end caps with a fusible alloy.

58. The assembly of claim 55, wherein an heating element is provided to liquify the fusible alloy on demand.

59. The assembly of claim 31, wherein the valve is a shut-off valve with the first position being an open position and the second position being a closed position.

60. The assembly of claim 59, wherein the member is a slidable valve stem.

61. A cartridge for a valve operable between a first configuration and a second configuration, comprising:

an activation component operatively connectible with the valve to maintain the valve in the first configuration until a predetermined pressure is exerted on the valve to force the valve toward the second configuration; and a hollow body having a first and second end, the hollow body substantially enclosing the activation component so that the cartridge is replaceable without any contact with the activation component and without replacing a movable valve component, wherein the activation component is a buckling pin configured to buckle when the predetermined pressure is exerted on the valve.

62. The cartridge of claim 61, wherein the valve is a pressure relief valve with the first configuration being a closed configuration and the second configuration being an open configuration.

63. The cartridge of claim 61, wherein the cartridge is engageable with a support structure to operatively connect the activation component with the valve.

64. The cartridge of claim 61, wherein the cartridge is marked with an industry code symbol stamp.

65. The cartridge of claim 61, wherein the cartridge is marked with a valve serial number.

66. The cartridge of claim 61, further comprising a first end cap mounted on the first end and a second slidably mounted end cap.

67. The cartridge of claim 66, further comprising an adjustable holder to accommodate buckling pins of variable lengths.

68. The cartridge of claim 67, wherein the adjustable holder, the buckling pin and the second end cap are an integral unit machined from one solid piece.

69. The cartridge of claim 63, wherein the support structure includes a first recess sized to fittingly receive a first end cap mounted on the first end of the hollow body and a second recess sized to fittingly receive the second end of the hollow body.

70. The cartridge of claim 69, wherein the first end cap and the second end of the hollow body are of different sizes to ensure the cartridge is orientated properly.

71. The cartridge of claim 70, wherein the first end cap is larger than the second end of the hollow body.

72. The cartridge of claim 69, wherein the first end cap and the second end of the hollow body are of different shapes to ensure the cartridge is orientated properly.

73. The cartridge of claim 63, further comprising a pair of slidably mounted end caps.

74. The cartridge of claim 61, wherein a spring ball secures the cartridge within the support structure.

75. The cartridge of claim 66, wherein the activation component is made of non-noble material.

76. The cartridge of claim 75, wherein the hollow body, the first and second end caps from a sealed enclosure.

77. The cartridge of claim 76, wherein the sealed enclosure is filled with an inert gas.

78. The cartridge of claim 61, wherein the activation component is made of a noble material.

79. The cartridge of claim 61, wherein the activation component is made of fusible alloy.

80. The cartridge of claim 66, wherein the activation component is welded to one of the end caps with a fusible alloy.

81. The cartridge of claim 80, wherein the activation component is welded to both of the end caps with a fusible alloy.

82. The cartridge of claim 61, wherein the valve is a shut-off valve with the first configuration being an open configuration and the second configuration being a closed configuration.

* * * * *

UNITED STATES PATENT AND TRADEMARK OFFICE
CERTIFICATE OF CORRECTION

PATENT NO. : 6,484,742 B1
DATED : November 26, 2002
INVENTOR(S) : Geof Brazier et al.

It is certified that error appears in the above-identified patent and that said Letters Patent is hereby corrected as shown below:

Column 13,
Line 30, "a industry" should read -- an industry --.
Line 46, "shape" should read -- shapes --.

Column 14,
Line 1, "an heating" should read -- a heating --.

Column 15,
Line 30, "an heating" should read -- a heating --.

Column 16,
Line 30, "claim 63" should read -- claim 61 --.
Line 32, "claim 61" should read -- claim 63 --.
Line 37, "from" should read -- form --.

Signed and Sealed this

Fifteenth Day of April, 2003

JAMES E. ROGAN
*Director of the United States Patent and Trademark Office*